(12) United States Patent
Crumpler et al.

(10) Patent No.: US 8,220,131 B2
(45) Date of Patent: Jul. 17, 2012

(54) ASSEMBLY OF AIRCRAFT COMPONENTS

(75) Inventors: Philip Crumpler, Bristol (GB); Richard Clayton, Gloucestershire (GB)

(73) Assignee: Airbus Operations Limited, Bristol (GB)

( * ) Notice: Subject to any disclaimer, the term of this patent is extended or adjusted under 35 U.S.C. 154(b) by 1063 days.

(21) Appl. No.: 12/094,431

(22) PCT Filed: Dec. 14, 2006

(86) PCT No.: PCT/GB2006/004711
§ 371 (c)(1),
(2), (4) Date: May 21, 2008

(87) PCT Pub. No.: WO2007/068949
PCT Pub. Date: Jun. 21, 2007

(65) Prior Publication Data
US 2008/0308211 A1 Dec. 18, 2008

(30) Foreign Application Priority Data
Dec. 16, 2005 (GB) .................................. 0525690.4

(51) Int. Cl.
*B23P 19/04* (2006.01)
*B32B 3/00* (2006.01)
(52) U.S. Cl. ........................................... 29/460; 156/70
(58) Field of Classification Search .................... 29/460, 29/428, 458, 464, 469, 527.1, 527.2, 897.2; 156/70; 523/434; 264/275, 238, 571, 265
See application file for complete search history.

(56) References Cited

U.S. PATENT DOCUMENTS

| | | | |
|---|---|---|---|
| 2,254,152 A | 8/1941 | Klemm | |
| 3,609,116 A | 9/1971 | Thomas et al. | |

FOREIGN PATENT DOCUMENTS

| | | |
|---|---|---|
| AU | 45754/85 A | 2/1986 |
| EP | 0 269 458 A1 | 6/1988 |
| EP | 1 081 043 A1 | 3/2001 |
| EP | 1 473 142 A1 | 11/2004 |
| GB | 1050884 | 12/1966 |
| WO | 01/14208 A1 | 3/2001 |
| WO | 01/19936 A1 | 3/2001 |
| WO | 03/039851 A1 | 5/2003 |
| WO | 2004/028785 A1 | 4/2004 |
| WO | 2004076769 | 9/2004 |

OTHER PUBLICATIONS

UK Search Report for GB0525690.4 dated Apr. 18, 2006.
International Search Report and Written Opinion for PCT/GB2006/004711 dated Mar. 14, 2007.

*Primary Examiner* — John C Hong
(74) *Attorney, Agent, or Firm* — Lowe, Hauptman, Ham & Berner, LLP

(57) ABSTRACT

A method is provided for preparing a first part for assembly to form an aircraft component, by applying a shim to a first surface of the first part, the method comprising the steps of placing the first surface of the part adjacent to a second surface of a second part, inserting a solid shim into a gap between the first and second surfaces and holding the shim in the inserted position, and subsequently introducing a liquid shim through the first part into a region between the first part and the solid shim.

13 Claims, 3 Drawing Sheets

ASSEMBLY OF AIRCRAFT COMPONENTS

RELATED APPLICATIONS

The present application is based on International Application Number PCT/GB2006/004711 filed Dec. 14, 2006, and claims priority from British Application Number 0525690.4 filed Dec. 16, 2005, the disclosures of which are hereby incorporated by reference herein in their entirety.

TECHNICAL FIELD

This invention relates to a method of preparing a part for assembly to form an aircraft component and more particularly to a method that involves the use of shims. The invention also relates to an aircraft component assembled by such a method.

BACKGROUND ART

The assembly of aircraft components, and especially larger components, presents various challenges. In particular the assembly may have to be carried out to very narrow tolerances but also at reasonable speed and as economically as possible. An example where such issues arise is in the assembly of a wing skin to rib feet to form a wing-box of an aircraft. In a conventional process, the wing skin is manufactured in a desired shape and is then brought into position against the sub components (rib and spars, for example) of the underlying structure of the wing-box to which the wing skin is to be secured. That underlying structure has outwardly projecting rib feet on which respective parts of the inner surface of the wing skin are required to rest so that fasteners can be inserted through the wing skin and the rib feet to secure them together. The external profile of the wing skin is important in terms of the aerodynamic performance of the aircraft and a strong connection between the wing skin and the rib feet is also important in terms of the structural strength of the wing-box.

Some tolerances have to be allowed for during manufacture and consequently when the wing skin is brought in an unstressed state into position against the rib feet, it is commonly found that, whilst some rib feet are in contact with the wing skin, others are spaced from it. To eliminate the spacings, there are two approaches that are adopted. A first approach is simply to deform the wing skin by the small amount necessary to bring the other rib feet into contact with the wing skin. An approach of that kind, however, results in a distortion of the external profile of the wing skin, which may adversely affect the aerodynamic performance of the wing, and in the introduction of additional internal stresses into the wing-box, which may adversely affect the structural strength of the wing. To avoid such problems, a second approach involving altering the dimensions of the underlying structure or the wing skin may be adopted. There are various ways in which that may be done, including fettling the rib feet, adding material to the wing skin or applying a shim to the rib feet.

There are also other parts in an aircraft, especially, but not exclusively, in a wing-box, where parts have to be assembled to close tolerances and liquid or solid shims are used.

Commonly, where a liquid shim is used, one of three different liquid shimming techniques is employed. In a first technique a solid shim of appropriate thickness is bonded to a part and a liquid shim (a substance that is applied as a liquid but cures to a solid) is applied over the solid shim. A second technique uses a liquid shim only and is used mainly for smaller gaps. A third technique involves first applying a liquid shim to a part and then applying a solid shim over the liquid shim. After the shim has been applied the parts to be joined are brought together. In order for the correct thickness of liquid shim to be present, it is important that the part to which the shim is applied is brought into position adjacent to the part it is to be joined to before the liquid shim is used. That introduces an unwelcome time constraint, which is particularly significant when many areas require shimming in a single assembly, for example where a wing skin is joined to a multiplicity of rib feet.

It is an object of the invention to provide a method of preparing a first part for assembly to form an aircraft component, in which method the problem referred to above is at least mitigated.

DISCLOSURE OF THE INVENTION

According to the invention there is provided a method of preparing a first part for assembly to form an aircraft component, by applying a shim to a first surface of the first part, the method comprising the steps of:

placing the first surface of the part adjacent to a second surface of a second part, inserting a solid shim into a gap between the first and second surfaces and holding the shim in the inserted position, and subsequently introducing a liquid shim through the first part into a region between the first part and the solid shim.

The method may further include the step of separating the first and second parts with the solid shim mounted on the first part and with the liquid shim between the solid shim and the first surface of the first part.

In the method of the invention as defined above the first part is assembled next to the second part before the liquid shim is applied. That assembly can therefore take a relatively long time without any risk of liquid shim curing (since it has not at that stage been applied).

In order to introduce the liquid shim through the first part, it is preferred that the first part has one or more passageways extending from the first surface through the thickness of the first part for allowing the introduction of the liquid shim through the first part, which may for example be a rib foot. The number of passageways may be chosen to allow liquid shim to spread over the first surface of the first part to the extent required. Usually it is desirable for the liquid shim to form a continuous layer and often the whole region between the first part and the solid shim is filled. In the case of a rib foot, for example, there may be four holes in total, with two holes associated with each of two solid shims on the foot.

The first part may be of metal and in that case the solid shim is preferably of metal. The first part may be of composite material and in that case the solid shim is preferably of composite material.

The solid shim is preferably held in the inserted position by temporarily fixing the solid shim to the second part. In that case, the method preferably further includes the step of subsequently detaching the solid shim from the second part. To fix the shim, adhesive tape, for example, masking tape, may be placed over projecting portions of the shim and secured to the second surface of the second part. The shim preferably includes one or more outwardly projecting tabs, which are preferably detachable and by which the shim is temporarily fixed to the second part. In a case where the solid shim is of generally oval shape, two tabs may be provided extending from opposite ends of the oval. The tabs may be fixed as integral parts of the solid shim but may be detachable for example by breaking them off, cutting or the like.

The liquid shim is preferably introduced by injecting it under pressure into the passageway in the first part. The liquid shim is then caused to spread out within the region between the solid shim and the first part. Any liquid shim that exudes from the periphery of the solid shim can be removed.

In principle the second part may not be the part to which the first part is to be joined in the final assembly but may just be a part that replicates precisely the shape of the surface adjacent to the solid shims in the final assembly, but it is preferred that it is. Thus in the embodiment where the first and second parts are separated following the liquid shim introduction, there is preferably an additional step of joining the first part with the shim to the second part. A further liquid shim may be provided between the solid shim and the second part when the parts are subsequently joined.

The first part may have a multiplicity of first surfaces to each of which a respective shim is applied by a method as defined above. The first part may for example include a plurality of rib feet.

The invention is especially relevant to the assembly of a wing-box.

According to another aspect of the invention, there is provided a method of preparing a first part for assembly to form an aircraft component, by applying a shim to a first surface of the first part, the method comprising the sequential steps of:

placing a solid shim adjacent to the first surface of the first part, introducing a liquid shim into a region between the first surface of the first part and the solid shim, and assembling the first part to a further part, with the solid shim mounted over the first surface of the first part, with the liquid shim between the solid shim and the first surface of the first part, and with the solid shim adjacent to the further part.

The invention also provides a method of assembling parts to form an aircraft component, the method including a method of preparing a first part for assembly as defined above.

The present invention further provides an aircraft component including a first part having a first surface, a solid shim mounted over the first surface, cured liquid shim between the solid shim and the first surface, the cured liquid shim also being present in one or more passageways extending from the first surface of the first part through the first part.

Also the present invention provides an aircraft component that has been assembled by a method as defined above.

BRIEF DESCRIPTION OF THE DRAWINGS

By way of example, certain embodiments of the invention will now be described with reference to the accompanying drawings, of which.

DESCRIPTION OF EMBODIMENTS OF THE INVENTION

Figure 1:
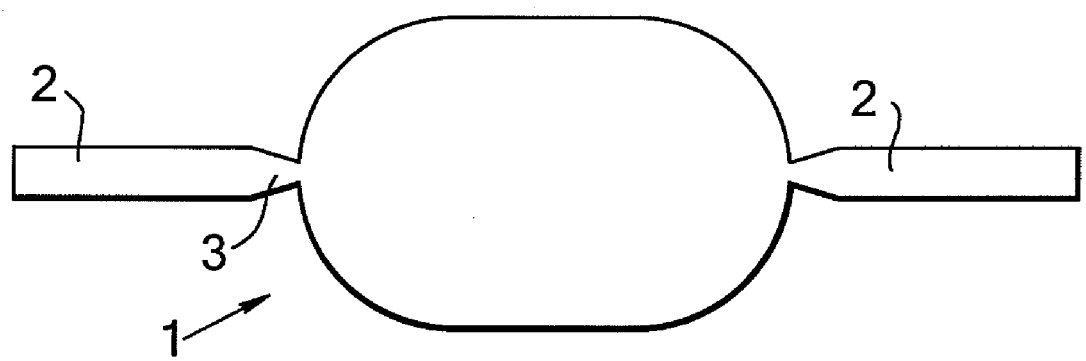
FIG. 1 is a plan view of a solid shim for use in assembling two parts according to a first embodiment of the invention.

The solid shim 1 shown in FIG. 1 is of a shape suitable for application to one end of a rib foot. In the particular example described it is made of glass fibre and has two tabs 2 each 30 mm long and 5 mm wide with a narrowed portion 3 where they join the main part of the shim. The shim of this particular example is of generally oval shape with the tabs 2 connected at opposite ends of the oval.

Figure 2:
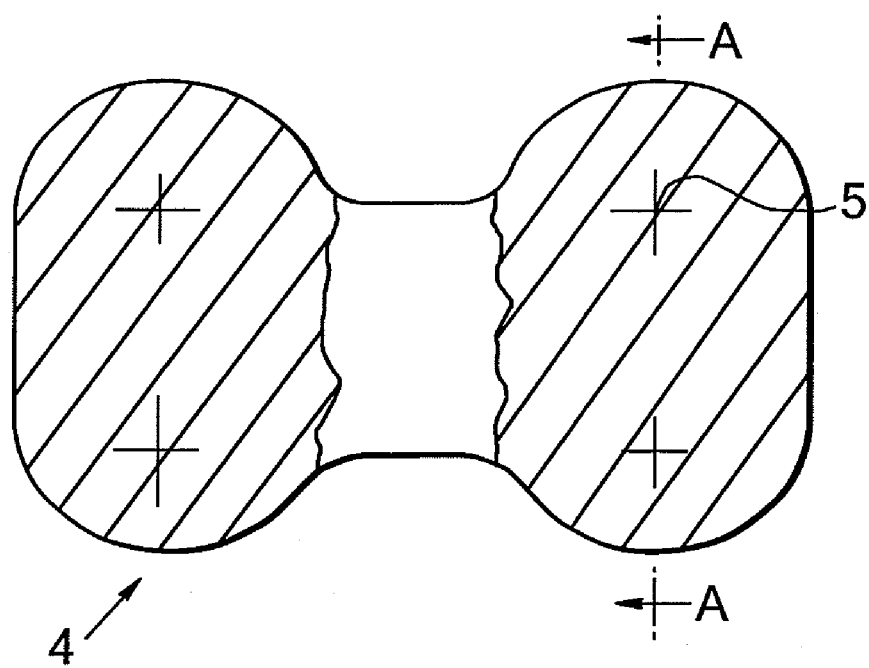
FIG. 2 is a plan view of a rib foot on which two solid shims of FIG. 1 are to be mounted.

FIG. 2 shows the shape of the end face of a rib foot 4. The foot 4 is to receive two shims 1, one over each of the shaded areas. The crosses in FIG. 2 mark the positions of four passageways 5 through the foot 4 (see FIG. 3A).

The way in which the foot 4 is prepared for assembly will now be described with reference to FIGS. 3A to 3E.

Figure 3A:
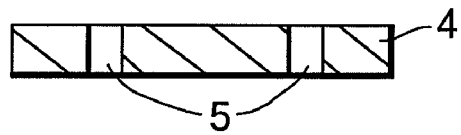
FIG. 3A is a schematic sectional side view of a rib foot.
Figure 3B:
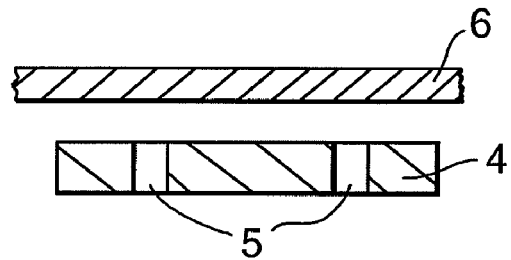
FIG. 3B is a schematic sectional side view of the part of the rib foot shown in FIG. 3A, with a cover positioned adjacent to, but spaced from, the rib foot.

Referring first to FIG. 3A, this is a sectional view of the rib foot 4 along the lines A-A in FIG. 2 and therefore intersecting two of the passageways 5. This drawing shows the rib foot at the beginning of the procedure.

A cover 6, which in this example is a wing skin, is brought into position adjacent to, but spaced from, the rib foot, with jigs (not shown) holding the parts in the positions that are required to be the final positions. In FIGS. 3A to 3E, the spacing of the parts is exaggerated for ease of illustration.

Figure 3C:
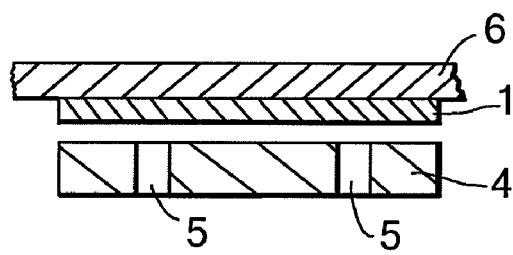
FIG. 3C is a schematic sectional side view of the assembly shown in FIG. 3B with a solid shim inserted into the gap between the cover and the rib foot.

With the parts held by the jigs in their required position, two solid shims 1 (one of which is visible in FIG. 3C) are inserted between the rib foot 4 and the wing skin 6, as shown in FIG. 3C. Two shims 1 are received on each rib foot 4 with each shim overlying one of the areas shaded in FIG. 2. It will be understood that although only one rib foot is shown in the drawings a typical rib of an aircraft wing-box includes a multiplicity of rib feet.

According to the exemplary embodiment described herein, the shims 1 are temporarily fixed to the wing skin 6 by masking tape (not shown) which is placed over the tabs 2 and releasably fixed to the wing skin 6.

Figure 3D:
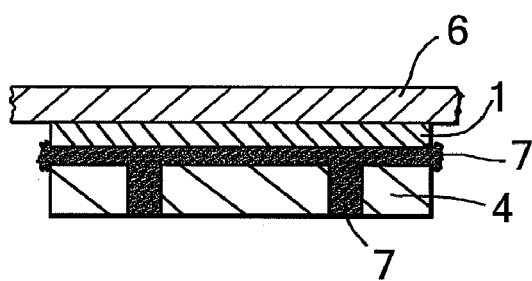
FIG. 3D is a schematic sectional side view of the assembly shown in FIG. 3C with liquid shim material injected between the solid shim and the rib foot according to the first embodiment of the invention.
Figure 3E:
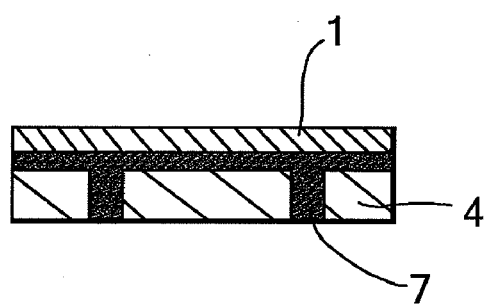
FIG. 3E is a schematic sectional side view of the assembly shown in FIG. 3D with the cover removed.

Once the shims have been temporarily fixed in position, a liquid shim 7 is injected through each of the passageways 5. That injection presses the solid shim 1 hard against the wing skin 6 and creates a layer of liquid shim between the rib foot 4 and the solid shim 1. The liquid shim spreads out radially from the passageways 5 and injection of the liquid shim is continued until all of the areas shaded in FIG. 2 are full of liquid shim. Any surplus liquid shim that exudes outwardly of the solid shim 1 is removed with a spatula. The passageways 5 remain full of liquid shim. This stage of the procedure is illustrated in FIG. 3D. Thus, the liquid shim assumes a thickness which is optimised for the precise location of the wing skin in relation to the rib feet.

According to the presently described embodiment of the invention, when the layer of liquid shim 7 has cured, the wing skin 6 is separated from the rib feet 4 carrying the solid shims 1. During that removal the adhesive tape becomes detached from either the wing skin 6 or the tabs 2 and can be removed entirely. The tabs 2 are then removed with a pair of end cutting snips leaving the rib foot 4 in the state shown in FIG. 3E. The foot can then be inspected to ensure that the solid shims 1 are correctly applied and that the liquid shim 7 fills the region between the foot 4 and the solid shims 1 in the shaded areas shown in FIG. 2.

Thereafter when the rib foot 4 is finally assembled to the wing skin 6, a precise fit is ensured between the shims 1 and the wing skin 6.

In FIGS. 3A to 3E, for ease of illustration no variation is shown in the spacing of the rib foot and the cover, and all the surfaces are shown as flat, but it will be understood that commonly there will be small variations which are accommodated by a variation in the thickness of each shim 1 and/or by a variation in the thickness of the layer of liquid shim 7.

Typically the thickness of the solid shim 1 and the thickness of the layer of liquid shim 7 are each in the range of 0.3 to 1.0 mm.

Figure 4:
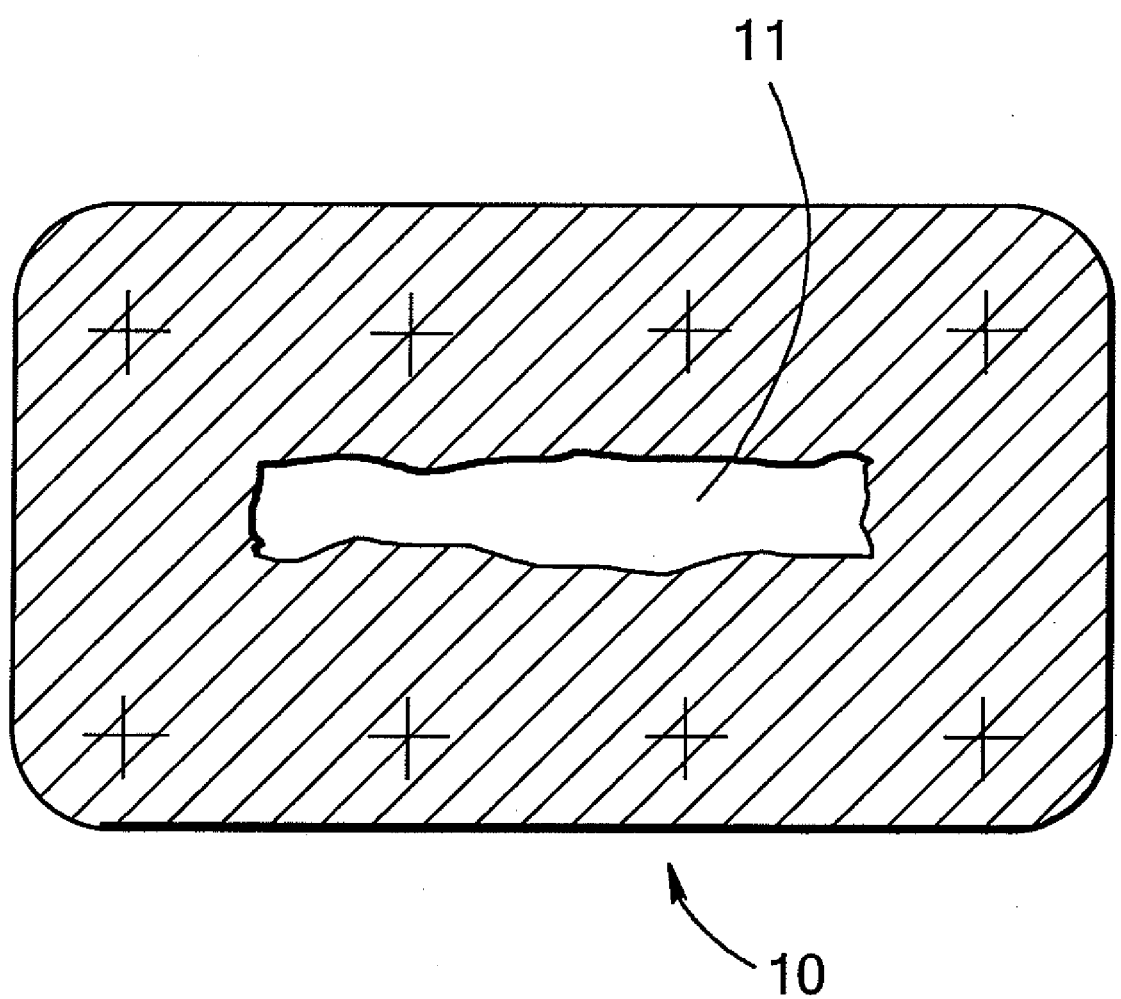
FIG. 4 is a plan view of a forward flap track attachment to which liquid and solid shim is applied according to a second embodiment of the invention.

Whilst one particular example of a solid shim has been described, it will be understood that the invention may be used with many other shapes of shim according to the particular application. For example, FIG. 4 shows a forward flap track attachment 10 which has eight through passageways marked by crosses so that liquid shim is provided over all but a central unshaded region 11. Furthermore, while the solid shim according to the presently described example is constructed from glass fibre, it is to be understood that other shim materials may be suitable and will generally depend on the application and the materials from which the first and second parts are fabricated.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of preparing a first part for assembly to form an aircraft component, by applying a shim to a first surface of the first part, the method comprising the steps of:
   placing the first surface of the part adjacent to a second surface of a second part,
   inserting a solid shim into a gap between the first and second surfaces and holding the shim against the second part in the inserted position, and
   subsequently introducing a liquid shim through the first part into a region between the first part and the solid shim.

2. A method as claimed in claim 1 comprising the further step of separating the first and second parts with the solid shim mounted on the first part and with the liquid shim between the solid shim and the first surface of the first part.

3. A method according to claim 1, in which the first part has one or more passageways extending from the first surface through the thickness of the first part for allowing the introduction of the liquid shim through the first part.

4. A method according to claim 1, in which the solid shim is held in the inserted position by temporarily fixing the solid shim to the second part.

5. A method according to claim 4, in which adhesive tape is placed over projecting portions of the shim and secured to the second surface of the second part.

6. A method according to claim 4, in which the solid shim includes one or more outwardly projecting detachable tabs by which the solid shim may be temporarily fixed to the second part.

7. A method according to claim 1, in which the liquid shim is introduced by injecting it under pressure into the first part.

8. A method according to claim 1, including subsequently joining the first part with the shim to the second part.

9. A method according to claim 8, in which a further liquid shim is provided between the solid shim and the second part where the parts are subsequently joined.

10. A method according to claim 1, in which the first part has a multiplicity of first surfaces to each of which a respective shim is applied by a method according to any preceding claim.

11. A method according to claim 1, in which the first part includes one or more rib feet.

12. A method according to claim 1, in which the aircraft component is a wing-box.

13. A method of preparing a first part for assembly to form an aircraft component, by applying a shim to a first surface of the first part, the method comprising the sequential steps of:
   placing a solid shim adjacent to the first surface of the first part,
   introducing a liquid shim only into a region between the first surface of the first part and the solid shim such that the opposing surface of the solid shim remains substantially free of liquid shim, and
   assembling the first part to a further part, with the solid shim mounted over the first surface of the first part, with the liquid shim only between the solid shim and the first surface of the first part, and with the solid shim adjacent to the further part.

* * * * *